April 26, 1955
R. C. FISCHER
2,707,058
TRACTOR IMPLEMENT REAR MOUNTED
Filed April 12, 1952
3 Sheets-Sheet 1
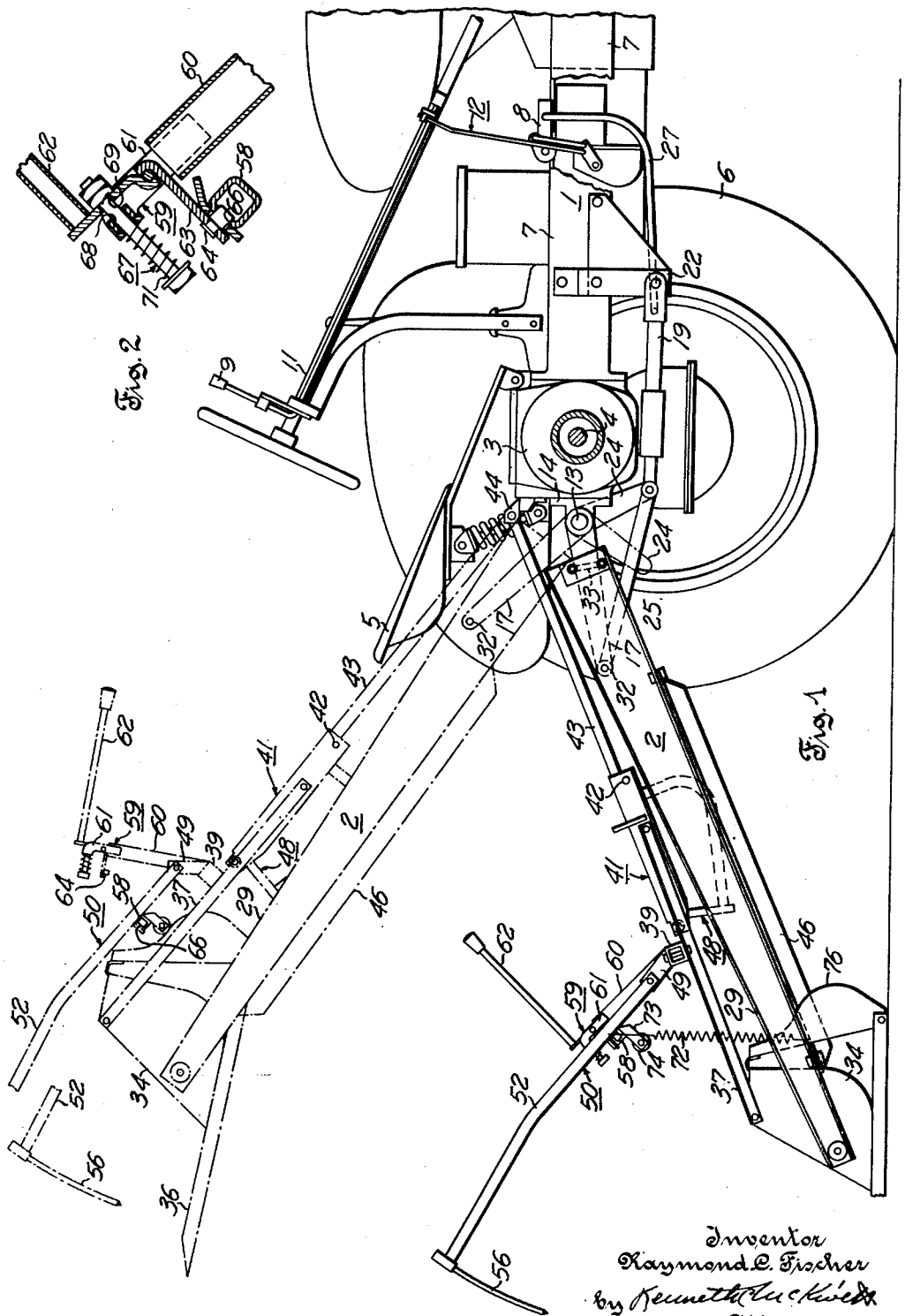
Inventor
Raymond C. Fischer
By Kenneth Luckie
Attorney April 26, 1955
R. C. FISCHER
2,707,058
TRACTOR IMPLEMENT REAR MOUNTED
Filed April 12, 1952
3 Sheets-Sheet 2
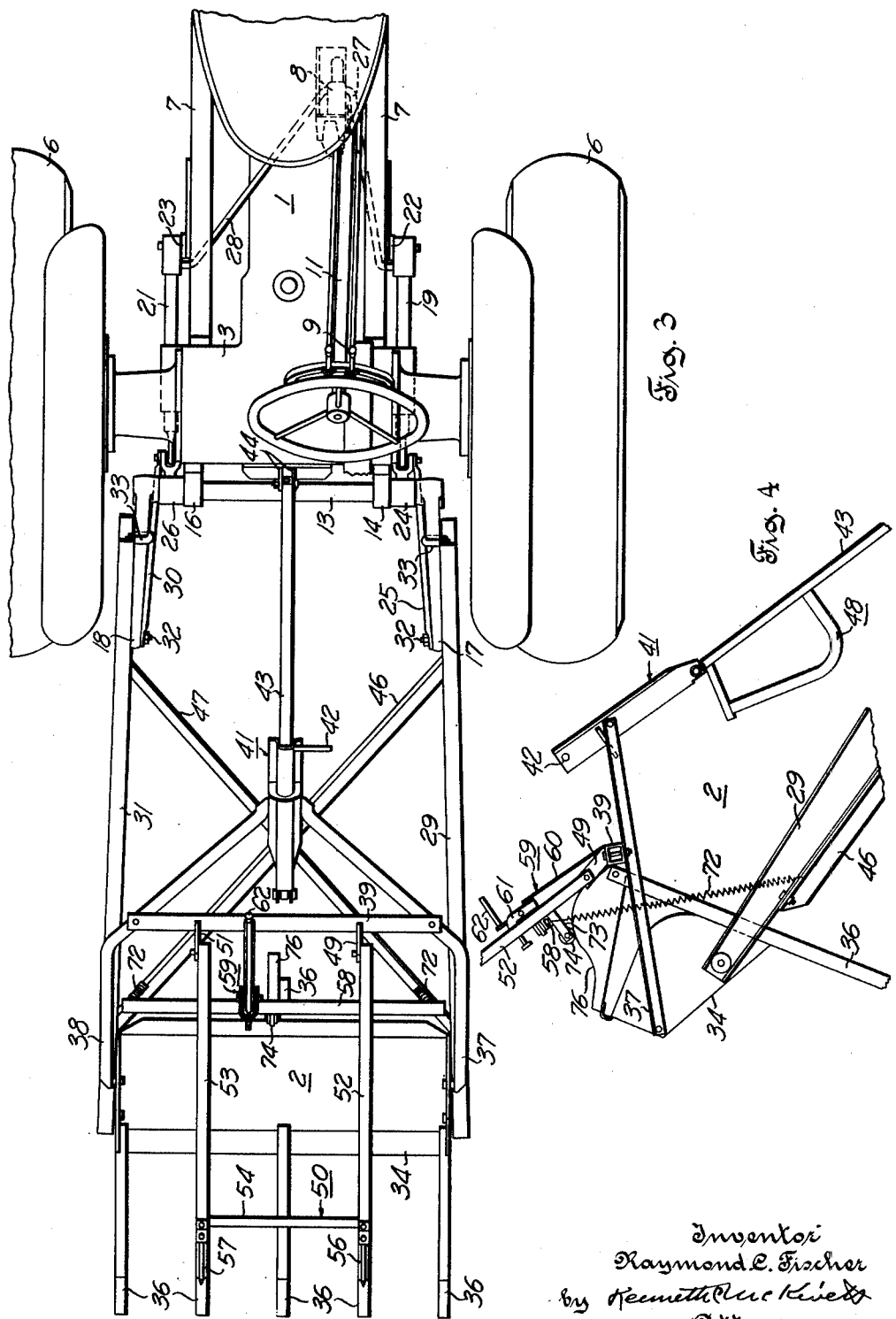
Inventor
Raymond C. Fischer
by Kenneth Ruckicks
Attorney United States Patent Office 2,707,058
Patented Apr. 26, 1955

2,707,058

TRACTOR IMPLEMENT REAR MOUNTED

Raymond C. Fischer, La Porte, Ind., assignor to Allis-Chalmers Manufacturing Company, Milwaukee, Wis.

Application April 12, 1952, Serial No. 281,965

12 Claims. (Cl. 214—140)

This invention relates generally to tractor mounted implements and is more particularly concerned with and contemplates the provision of implement and tractor carried parts coactable in an improved manner advantageously affecting the mounting, demounting, and operation of such implements.

In the past, it has been customary to attach an implement to the front or rear of a tractor by means of a pair of laterally spaced draft bars designed to transmit a propelling force from the tractor to the implement. Usually such bars are attached to the tractor for vertical swinging movement relative thereto about a generally horizontal transverse axis and a conventional tractor carried lift mechanism is operatively connected with the implement frame or draft bars by means of a pair of vertically disposed, laterally spaced lift links. Also, arrangements are known wherein an implement is provided with a rigid draft structure detachably fixedly connected with a tractor drawbar for movement in unison therewith about a transverse axis and the tractor carried lift mechanism is operatively connected either with the drawbar or draft structure, generally as aforesaid.

Such arrangements all require one or more lift links adjustable as to length in order to accommodate different types of implements. Moreover, these arrangements are not particularly suited for mounting cumbersome structures, for example, side delivery rakes, grain drills, fertilizer distributors, etc., without the provision of additional linkages or equivalent means designed to afford lateral stability. Furthermore, the connections which must be made or detached in the heretofore known manner of mounting implements materially reduce the time available for operating the tractor, or the combined implement and tractor, as desired.

An important object of the present invention is the provision of an implement frame having parts readily coactable with the conventional lift elements of a tractor in an improved manner wherein such elements afford substantially the sole support for the implement.

Another object of the present invention is the provision of a tractor mounted implement embodying parts and elements combined as aforesaid for coaction in an improved manner minimizing the time and effort required for mounting and demounting the implement.

Still another object of this invention is the provision of an implement frame and a tractor carried lift mechanism having parts combinable in an improved manner affording a compact implement supporting structure which positions the implement in close coupled relation to the tractor and renders the lift mechanism effective to raise, lower and hold the implement in any desired position.

Another object of this invention is to provide means coacting with a tractor mounted scoop shovel for maintaining material on the shovel as same is elevated to dumping position.

Another object of this invention is to provide means coacting with a tractor mounted scoop shovel for maintaining material on the shovel as same is elevated to dumping position and wherein said means is gradually withdrawn from the material as the shovel is elevated.

Another object of this invention is to provide means coacting with a tractor mounted scoop shovel for maintaining material on the shovel as same is elevated to dumping position and including means on the shovel coacting with said maintaining means for shifting the latter to a spaced removed position during the dumping process.

Accordingly, this invention may be considered as comprising the various features of construction and combination hereinafter more fully set forth in the following detailed description and appended claims, reference being had to the accompanying drawings, wherein:

Fig. 1 is a side elevation of a tractor with the near traction wheel removed for the sake of clarity and with a loading device attached to the rear of the tractor, the device is shown in full line in the loading position and the dot and dash line in the raised position;

Fig. 2 is an enlarged section view of a detail of the hook latching device shown in Fig. 1;

Fig. 3 is a plan view of the tractor and loading device shown in Fig. 1;

Fig. 4 is a side elevation of the loading device shown in Fig. 1 shown in unloading or dumping position;

Figure 5:
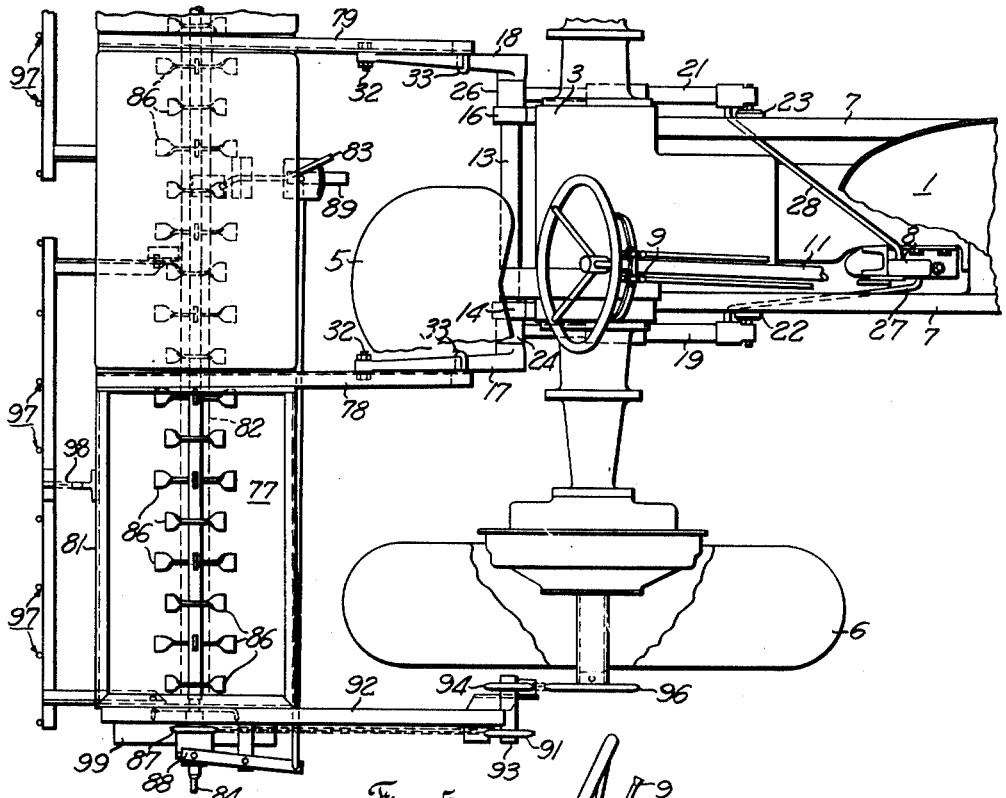
Fig. 5 is a plan view of a tractor with a fertilizer spreader attached to the rear end thereof.

Referring to the drawings, it is seen in Fig. 1 that a conventional type of tractor 1 has been provided with a unitary implement structure in the nature of a rear mounted loader 2, which loader is attached to the rear end of the tractor. This tractor includes a rear axle housing 3 rotatably supporting a rear axle structure 4 and an operator's seat 5 and having traction wheels 6 operatively connected to the ends thereof. A longitudinal frame 7 extends forwardly from this axle housing and mounts an engine thereon (not shown). Also mounted on frame 7 is a hydraulic pump 8 which is operatively connected to the tractor engine by means not shown. A hand lever 9 carried by the steering wheel column 11 of the tractor is connected through linkage 12 with the hydraulic pump for controlling the operation of same.

A rock shaft 13 extending transversely across the rear end of axle housing 3 is pivotally supported by brackets 14 and 16 attached to housing 3 (see Fig. 3). Rock shaft 13 has attached to the ends thereof a pair of laterally spaced lift arms 17 and 18 projecting longitudinally outward from the ends of said rock shaft in generally parallel side opposed relation with respect to each other.

A pair of hydraulic rams 19 and 21 each have an end thereof attached to pivot pins on brackets 22 and 23, respectively, for pivotal movement relative thereto. These brackets are rigidly attached to tractor frame 7. The opposite ends of hydraulic rams 19 and 21 are pivotally connected to lift cranks 24 and 26, respectively, which are attached to rock shaft 13 adjacent to laterally spaced lift arms 17 and 18, respectively. Hydraulic rams 19 and 21 are hydraulically connected to pump 8 by means of tubes 27 and 28, respectively.

By means of hand lever 9 the operator of the tractor is able to control the action of hydraulic rams 19 and 21 and thereby, the position of loader 2. That is, the operator can cause pump 8 to be actuated by the tractor engine to increase the fluid pressure within the rams and thereby expand same pivoting rock shaft 13 clockwise as viewed in Fig. 1 and raising loader 2; by setting the hand lever at the proper position, the operator can actuate the hydraulic pump to maintain the fluid pressure within the hydraulic rams constant and thereby maintain rock shaft 13 and loader 2 stationary; or by a proper setting of the hand lever, the operator can stop operation of the hydraulic pump and release the fluid pressure within the rams and thereby permit the weight of loader 2 to lower same and to pivot rock shaft 13.

As is shown in Figs. 1 and 3, a rear mounted loader 2 is shown attached to the tractor. This loader includes a pair of longitudinal extending channel members 29 and 31 which present laterally spaced free end portions detachably connected to lift arms 17 and 18, respectively, forming rigid outward extensions thereof, such connection being accomplished by means of bolts and nuts indicated by reference numeral 32 and by U-bolt and nuts indicated by reference numeral 33. Brace links 25 and 30 connect the rearward ends of lift arms 17 and 18 with lift cranks 24 and 26, respectively. At the rearward end of channel members 29 and 31 a bucket or shovel 34 is pivotally attached. This bucket has fork teeth 36 on the lower surface thereof which are adapted to be slid along the ground to dig under a pile of manure or the like and fill bucket 34 with same. Pivotally attached to opposite sides of upper portions of bucket 34 are a pair of longitudinally forwardly extending actuating link members 37 and 38 which are joined by transversely extending tube 39. From the point of attachment with tube 39, members 37 and 38 angle inwardly toward each other and pivotally join onto a longitudinal midportion of trip lock or power transmitting element 41. Lock 41 is channel shaped in cross section and has a trip handle 42 attached adjacent one end thereof and a pivot connection with a front or guide link member 43 at the other end thereof. Front link 43 extends longitudinally forwardly from trip lock 41 to a pivotal connection with bracket 44 carried by the tractor axle housing 3.

A pair of intersecting truss support arms 46 and 47 rigidly connect channel members 29 and 31. A box frame 48 is attached to the lower portion front link member 43 and as shown by Fig. 1 will limit the downward movement of trip lock 41 or link member 43 by contacting intersecting truss support arms 46 and 47.

A pair of transversely spaced brackets 49 and 51 carried by transversely extending tube 39 pivotally support a claw structure or spike assembly 50 including a pair of longitudinally extending arms 52 and 53, respectively, which are joined adjacent their rearward ends by transverse element 54. Depending from rear ends of elements 52 and 53 are spike elements 56 and 57, respectively. Arms 52 and 53 are also spaced apart by transverse tube member 58. Also attached to transverse tube 39 is a latch assembly 59 for spike assembly 50. This latch assembly includes a tube 60 attached at one end to transverse member 39 and supporting a latch member 61 at the other end thereof. A latch operating element 62 includes an offset element 63 pivotally attached to member 61 with offset element 63 having a plug 64 (see Fig. 2) engageable within an aperture 66 in tube 58. A bolt 67 is slidably received within an aperture 68 in tube 61 and within an aperture 69 in offset element 63. Spring 71 surrounding bolt 67 biases operating lever 62 in a counterclockwise direction as shown in Fig. 2 maintaining a connection between the spike assembly and operating lever 62 by plug 64 being biased into aperture 66. To release the spike assembly all that has to be done is to move operating lever 62 in a clockwise direction which will remove plug 64 from the aperture 66 in tube 58 thereby permitting hooks 56 and 57 to move in a counterclockwise direction as urged by springs 72 which are connected between tube 58 and members 46 and 47 biasing the hook assembly in approximate superposed relation to bucket 34 as shown in dot and dash lines in Fig. 1.

Tube member 58 of the hook assembly is also provided with a depending strap 73 having a cam follower 74 on the lower end thereof. Bucket 34 is provided on the rear end thereof with a cam 76 coactable with cam follower 74.

The operation of this rear mounted manure loader is as follows: Assume that the loader would be in position as shown in solid lines in Fig. 1. The tractor would be backed up until a sufficient load of manure (not shown) had been gathered into bucket 34. Operating lever 62 would then be actuated in a clockwise direction by the tractor operator to permit retaining spikes 56 and 57 to be biased downwardly into the gathered manure an the bucket with the spikes being in position substantially as shown by the dot and dash lines in Fig. 1. The operator of the tractor would then actuate hydraulic lever 9 which would cause lift arms 17 and 18 to raise the loader to the dot and dash line position shown in Fig. 1.

It is to be noted that channel members 29 and 31 and elements 37, 38, 41 and 43 form substantially a parallelogram with bucket 34 and the rear end of tractor housing 3. This is not quite a true parallelogram in that channel members 29 and 31 are slightly longer than the combined effective lengths of rear links 37, 38, lock 41 and front link 43 which results in a slight tipping of the bucket as it is raised. In full raised position the receiving end of the bucket will be 10 degrees elevated out of a horizontal position which will aid in maintaining the manure load in the bucket. Thus it is seen that during loading operation while there is a generally rigid relation between the bucket and its support arms, at the same time a small amount of relative pivotal movement is desirably had between bucket and support arms when the bucket is being raised.

During the process of raising the bucket, cam follower 74 coacts with cam 76 to slightly raise and withdraw spikes 56 and 57 from the manure in the bucket. This slight withdrawal makes it easier to dump the bucket when it is so desired but with the spikes still effective to maintain the manure in the bucket until dumping is desired.

After the bucket is filled and elevated, the operator of the tractor then backs up the tractor and loader to a position where the loaded bucket overlies a manure spreader or other object in which it was desired to dump the manure. The operator then reaches back, lifts up handle member 42 of lock or intermediate link 41 thus folding links 37, 38 and 43 into the position shown in Fig. 4, this being an overcenter linkage or toggle mechanism, the forward end of bucket 34 would then pivot in a counterclockwise direction as viewed in Fig. 4 and during the pivoting movement of the bucket cam 76 would actuate cam follower 74 to move hook assembly 50 in a clockwise direction to latched position as is shown in Fig. 4.

After the load of manure has been dropped the bucket may then be rotated in a clockwise direction, as viewed in Fig. 4, by the operator exerting a pull on handle 42 until lock 41 has been relatched in an unfolded self-locking overcenter position and bucket 34 is then ready to be lowered for another load.

From the foregoing it is seen that a loader having rigid draft members 29 and 31 is readily unitable with tractor lift arms 17 and 18, respectively, to form rigid outward extensions of said lift arms, the combined lift arms 17 and 18 and rigid side members 29 and 31 afford substantially the sole support for loader 2. The linkage maintaining the bucket 34 from excessive pivoting exerts no real force in supporting the bucket 34.

Figure 6:
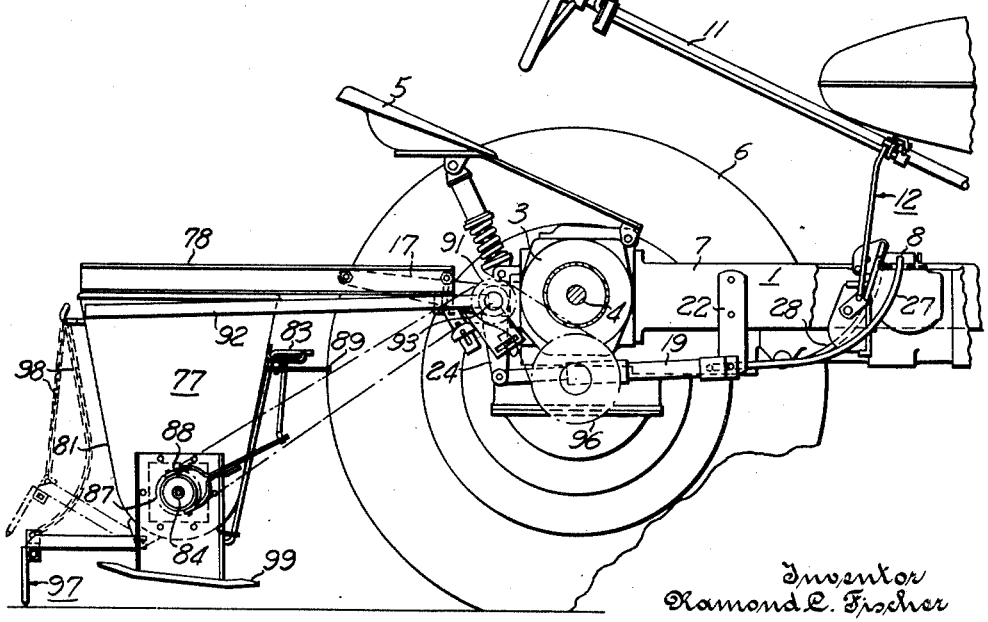
Fig. 6 is a side elevation of the tractor and spreader shown in Fig. 5.

Figs. 5 and 6 show a fertilizer distributor 77 which may be substituted for the loader 2 shown in Figs. 1 through 4, and be raised and lowered by the same hydraulic means provided on tractor 1.

Fertilizer distributor 77 includes a hopper structure 81 having a generally V-shaped cross section. This hopper extends laterally outward beyond the tread portions of wheels 6 and is provided with longitudinally extending draft frame members 78 and 79 spaced apart in generally parallel relation a distance conforming with the lateral spacing of lift arms 17 and 18 and forming rearward extensions thereof when rigidly connected thereto by means of bolts 32 and U-bolts 33.

Hopper 81 is provided with an adjustable bottom portion including a series of apertures 82 which can be adjusted as to size by manipulation of a hand lever 83 pivotally mounted on a bracket carried by hopper 81 in a position to be easily reached from the operator's seat 5. A shaft 84 is rotatably supported in end portions of hopper 81 and has a series of impeller elements 86 attached thereto for rotation therewith. Shaft 84 is connected to a sprocket 87 by means of a combination clutch member 88 which is operable by hand lever 89 which is pivotally carried on hopper 81 adjacent lever 83. Clutch member 88 is preferably also an overload clutch the details of which are not shown because they are conventional. This overload function of clutch 88 is operable in the event that elements 86 contact large pieces of fertilizer material and jam same against hopper 81. Sprocket 87 is chain connected to sprocket 91 carried by arm 92 extending from hopper 81. Sprocket 91 is connected to one end of shaft 93 rotatably journaled in the forwardly extending end of arm 92. The other end of shaft 93 has attached thereto a sprocket 94 chain connected to drive sprocket 96 which is attached to the hub of wheel 6.

Pivotally attached to brackets on lower portions of hopper 81 are a series of drag teeth 97 which rake the fertilizer material dropped from the hopper into the soil thereby preventing the fertilizer material from being blown away by the wind. The rake teeth may be retained in elevated nonoperative position (as indicated in dot and dash lines) by means of a chain 98. When operating on sod the drag teeth are usually positioned in this inoperative position.

A pair of transversely spaced support elements or shoes 99 (only one of which is shown) are provided at the ends of the hopper structure. The purpose of these shoes is to support the hopper structure when it is detached from the tractor lift arms and if desired the fertilizer attachment can be operated with the shoes contacting the ground. When the fertilizer attachment is raised to inoperative or transport position, the rake tooth structure 97 is automatically raised by the shoes 99 contacting same.

From the foregoing it is seen that an implement including a rigid draft structure has been provided wherein the draft structure presents laterally spaced portions adapted to be connected with and form rigid outward extensions of lift arms of a tractor, and means have also been provided for detachably uniting this draft structure to form substantially the sole support for the implement.

It should be understood that this invention is not limited to the particular details of construction and design shown and described herein and that the invention includes such other applications and modifications as are fairly included within the scope of the appended claims.

It is claimed and desired to secure by Letters Patent:

1. In combination with a tractor, a rock shaft operatively carried by an end portion of said tractor for pivotal back and forth movement on an axis extending transversely of and in horizontally and vertically fixed relation to said tractor, said shaft presenting a pair of laterally spaced lift arms projecting longitudinally outward from said end portion of the tractor in generally parallel side opposed relation with respect to each other, an implement comprising a rigid draft structure presenting laterally spaced portions adapted to be connected with and from rigid outward extensions of said lift arms, means detachably rigidly uniting said spaced portions and lift arms for up and down swinging movement of said draft structure in unison with said lift arms about said axis of said rock shaft, said combined lift arms and draft structure affording substantially the sole support for said implement, and means operatively connected with said shaft for selectively turning the latter about said axis to thereby place and retain said draft structure in any desired position within a predetermined range of vertical movement.

2. In combination with a tractor having a wide rear axle structure supported on a pair of laterally spaced traction means mounted adjacent opposite ends of said structure, a rock shaft operatively carried by said tractor for pivotal back and forth movement on an axis in rearwardly disposed generally parallel relation to said axle structure, said shaft presenting a pair of laterally spaced rearwardly projecting lift arms disposed between said traction means in generally parallel relation with respect to each other, an implement comprising a generally rigid frame presenting a draft structure terminating in free end portions laterally spaced apart a distance conforming with the lateral spacing of said lift arms and adapted to form rearward extensions thereof, means detachably rigidly uniting said lift arms and the free end portions of said draft structure for up and down swinging movement of said draft structure in unison with said lift arms about said axis of said rock shaft, said tractor lift arms and draft structure affording substantially the sole support for said implement, and means operatively connected with said shaft for selectively turning the latter about said axis to thereby place and retain said draft structure in any desired position within a predetermined range of vertical movement.

3. In combination with a tractor having a wide rear axle structure supported on a pair of laterally spaced traction means mounted adjacent opposite ends of said structure, a rock shaft operatively carried by said tractor for pivotal back and forth movement on an axis in rearwardly disposed generally parallel relation to said axle structure, said shaft presenting a pair of laterally spaced rearwardly projecting lift arms disposed between said traction means in generally parallel relation with respect to each other, an elongated expandable power transmitting means disposed to extend longitudinally of the tractor beneath said axle structure and having one end pivotally reacting against a fixed tractor carried part and its opposite end operatively connected with said shaft for selectively turning the latter about said axis to thereby place and retain said arms in any desired position within a predetermined range of vertical angular movement, an implement comprising a generally rigid frame presenting a draft structure terminating in free end portions laterally spaced apart a distance conforming with the lateral spacing of said lift arms and adapted to form rearward extensions thereof, and means detachably rigidly uniting said lift arms and the free end portions of said draft structure for up and down swinging movement of said draft structure in unison with said lift arms about said axis of said rock shaft, said united lift arms and draft structure affording substantially the sole support for said implement.

4. In combination with a tractor having a wide rear axle structure supported on a pair of laterally spaced traction means mounted adjacent opposite ends of said structure, a rock shaft operatively carried by said tractor for pivotal back and forth movement on an axis in rearwardly disposed generally parallel relation to said axle structure, said shaft presenting a pair of laterally spaced rearwardly projecting lift arms disposed between said traction means in generally parallel relation with respect to each other, an implement comprising a generally rigid frame extending transversely of the tractor immediately to the rear of said traction means and laterally outward beyond the tread portions thereof, said frame having a draft structure rigid therewith and projecting forwardly from a midportion thereof, said draft structure terminating in free end portions laterally spaced apart a distance conforming with the lateral spacing of said lift arms and adapted to form rearward extensions thereof, means detachably rigidly uniting said lift arms and the free end portions of said draft structure for up and down swinging movement of said draft structure in unison with said lift arms, said united lift arms and draft structure affording substantially the sole support for said implement, and means operatively connected with said shaft for selectively turning the latter about said axis to thereby place and retain said draft structure in any desired position within a predetermined range of vertical movement.

5. In combination with a tractor having a wide rear axle structure supported on a pair of laterally spaced traction means mounted adjacent opposite ends of said structure, a rock shaft operatively carried by said tractor for pivotal back and forth movement on an axis in rearwardly disposed generally parallel relation to said axle structure, said shaft presenting a pair of laterally spaced rearwardly projecting lift arms disposed between said traction means in generally parallel relation with respect to each other, an elongated expandable power transmitting means disposed to extend longitudinally of the tractor beneath said axle structure and having one end pivotally reacting against a fixed tractor carried part and its opposite end operatively connected with said shaft for selectively turning the latter about said axis to thereby place and retain said arms in any desired position within a predetermined range of vertical angular movement, an implement comprising a generally rigid frame extending transversely of the tractor immediately to the rear of said traction means and laterally outward beyond the tread portions thereof, said frame having a draft structure rigid therewith and projecting forwardly from a midportion thereof, said draft structure terminating in free end portions laterally spaced apart a distance conforming with the lateral spacing of said lift arms and adapted to form rearward extensions thereof, and means detachably rigidly uniting said lift arms and the free end portions of said draft structure for up and down swinging movement of said draft structure in unison with said lift arms about said axis of said rock shaft, said united lift arms and draft structure affording substantially the sole support for said implement.

6. In combination with a tractor having a wide rear axle structure supported on a pair of laterally spaced traction means mounted adjacent opposite ends of said structure, a rock shaft operatively carried by said tractor for pivotal back and forth movement on an axis in rearwardly disposed generally parallel relation to said axle structure, said shaft presenting a pair of laterally spaced rearwardly projecting lift arms disposed between said traction means in generally parallel relation with respect to each other, an implement comprising a generally rigid frame presenting a draft structure terminating in free end portions laterally spaced apart a distance conforming with the lateral spacing of said lift arms and adapted to form rearward extensions thereof, means detachably rigidly uniting said lift arms and the free end portions of said draft structure for up and down swinging movement of said draft structure in unison with said lift arms about said axis of said rock shaft, said united lift arms and draft structure affording substantially the sole support for said implement, said implement including a ground engaging tool mounted on said frame for pivotal movement relative thereto about an axis generally parallel to the axis of said shaft, means pivotally connecting an upper portion of said tool with a part fixed on said tractor above said shaft, said last mentioned means comprising interconnected elements selectively positionable in displaced relation to thereby vary the angular position of said tool relative to said frame or in generally aligned rigidly united relation, and means operatively connected with said shaft for selectively turning the latter to thereby place and retain said draft structure in any desired position within a predetermined range of vertical movement.

7. In combination with a tractor having a wide rear axle structure supported on a pair of laterally spaced traction means mounted adjacent opposite ends of said structure and having an operator's seat disposed in superposed relation to said axle structure, a rock shaft operatively carried by said tractor for pivotal back and forth movement on an axis in rearwardly disposed generally parallel relation to said axle structure and below said seat, said shaft presenting a pair of laterally spaced rearwardly projecting lift arms disposed between said traction means in generally parallel relation with respect to each other, an implement comprising a generally rigid frame presenting a draft structure terminating in free end portions laterally spaced apart a distance conforming with the lateral spacing of said lift arms and adapted to form rearward extensions thereof, means detachably rigidly uniting said lift arms and the free end portions of said draft structure for up and down swinging movement of said draft structure in unison with said lift arms about said axis of said rock shaft, said united lift arms and draft structure affording substantially the sole support for said implement, said implement including a ground working tool mounted on said frame for pivotal movement relative thereto about an axis generally parallel to the lengthwise axis of said shaft, means pivotally connecting a portion of said tool above said tool axis with a part fixed on said tractor above said shaft, said last mentioned means comprising a pair of elements interconnected by a toggle mechanism disposed within easy reach of an operator sitting on said seat and being actuable to selectively position said elements in vertically displaced relation to thereby vary the angular position of said tool relative to said frame or in generally aligned rigidly united relation, and means operatively connected with said shaft axis for selectively turning the latter about said shaft axis to thereby place and retain said draft structure in any desired position within a predetermined range of vertical movement.

8. A loader attachment for tractors comprising, in combination, a loader frame presenting a pair of rigidly interconnected side members, fastening means cooperable with said side members for detachably connecting one end of said side members to a pair of tractor lift arms, a scoop rockably mounted on the other end of said side members for back and forth movement relative thereto between material carrying and material dumping positions, a toggle mechanism including a guide link having a pivot center at one end thereof adjacent said one end of said side members, means for detachably connecting said pivot center to said tractor in spaced elevated relation to said frame, an actuating link pivotally connected at one end thereof with said scoop in spaced elevated relation to said frame, and an intermediate link hingedly connected to the other ends of said guiding and actuating links, said toggle mechanism being actuable for moving said scoop to material carrying and to material dumping positions; and a claw structure pivotally mounted on said actuating link for back and forth swinging movement in overlying relation to said scoop between material confining and material releasing positions.

9. A loader attachment as set forth in claim 8 and further comprising resilient means operatively interposed between said loader frame and said claw structure for biasing the latter toward said material confining position.

10. A loader attachment for tractors comprising, in combination, a loader frame presenting a pair of rigidly interconnected side members, fastening means cooperable with said side members for detachably connecting one end of said side members to a pair of tractor carried lift arms, a scoop rockably mounted on the other end of said side members for back and forth movement relative thereto between material carrying and material dumping positions, a toggle mechanism including a guide link having a pivot center at one end thereof adjacent said one end of said side members, means for detachably connecting said pivot center to said tractor in spaced elevated relation to said frame, an actuating link pivotally connected at one end thereof with said scoop, and an intermediate link hingedly connected to the other ends of said guiding and actuating links, said toggle mechanism being actuable for moving said scoop to material carrying and to material dumping positions; a claw structure pivotally mounted on said actuating link for back and forth swinging movement in overlying relation to said scoop between adjacent material confining and superposed spaced material releasing positions, and power transmitting means operatively connected, respectively, with said scoop and claw structure and cooperable therewith to move said claw structure from said adjacent material confining to said superposed spaced material releasing position upon movement of said scoop from said material carrying to said material dumping position.

11. A loader attachment as set forth in claim 10 and further comprising a locking element adjustably mounted on said actuating link for movement selectively into and out of cooperative engagement with said claw structure upon movement of the latter to said material releasing position.

12. A loader attachment for tractors comprising, in combination, a loader frame presenting a pair of rigidly interconnected side members for detachably connecting one end of said side members to a pair of tractor carried lift arms, a scoop rockably mounted on the other end of said side members for back and forth movement relative thereto between material carrying and material dumping positions, a toggle mechanism including a guide link having a pivot center at one end thereof adjacent said one end of said side members, means for detachably connecting said pivot center to said tractor in spaced elevated relation to said frame, an actuating link pivotally connected at one end thereof with said scoop, and an intermediate link hingedly connected to the other ends of said guiding and actuating links, said toggle mechanism being actuable for moving said scoop to material carrying and to material dumping positions; a claw structure pivotally mounted on said actuating link for back and forth swinging movement in overlying relation to said scoop between adjacent material confining and superposed spaced material releasing positions, a cam element fixedly secured to said scoop, and a cam follower element mounted on said slaw structure and cooperable with said cam element to move said claw structure from said adjacent material confining to said superposed spaced material releasing position upon movement of said scoop from said material carrying to said material dumping position.

References Cited in the file of this patent

UNITED STATES PATENTS

| 2,311,671 | Larsen | Feb. 23, 1943 |
| 2,445,076 | Munson | July 13, 1948 |
| 2,496,874 | Holopainen | Feb. 7, 1950 |
| 2,501,243 | Snyder | Mar. 21, 1950 |
| 2,511,439 | Lacey | June 13, 1950 |